Nov. 19, 1968   C. H. EMERY ET AL   3,411,646
CAMPER MANIPULATING APPARATUS FOR MOTOR VEHICLE
Filed Jan. 26, 1967   3 Sheets-Sheet 1
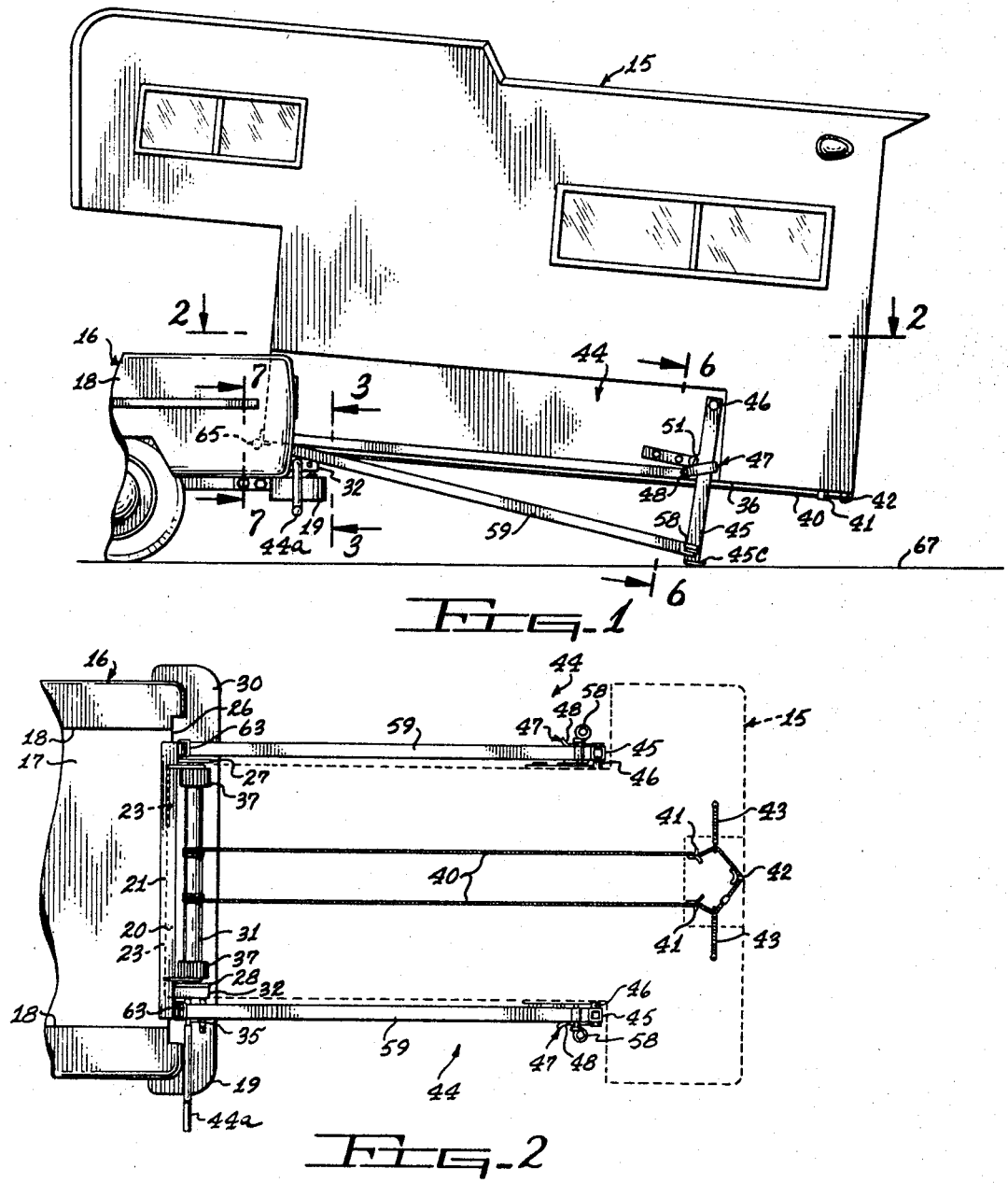
INVENTORS.
CARYL H. EMERY AND
ROGER P. WECKWERTH
BY
Willard S. Growe
ATTORNEY

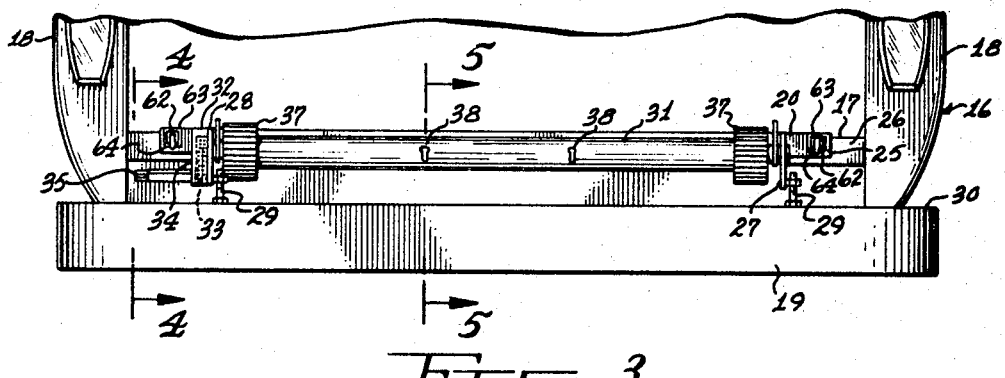
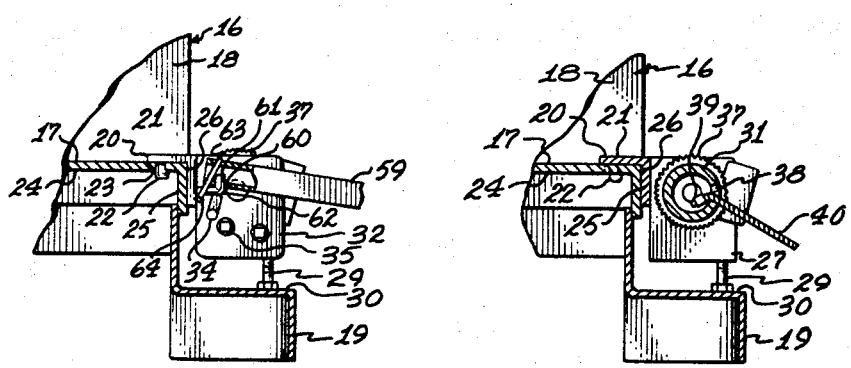
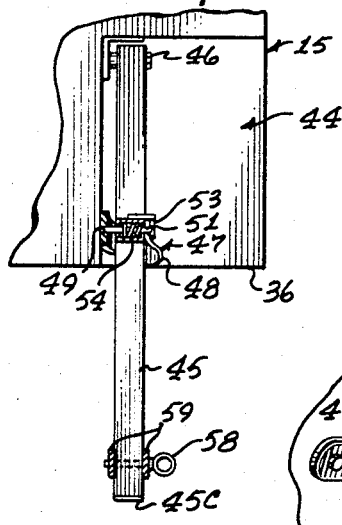
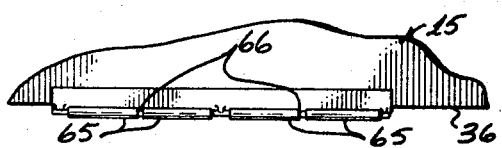

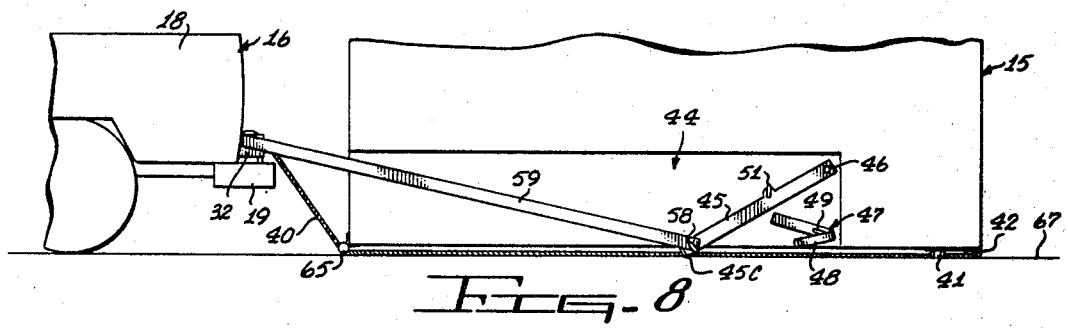
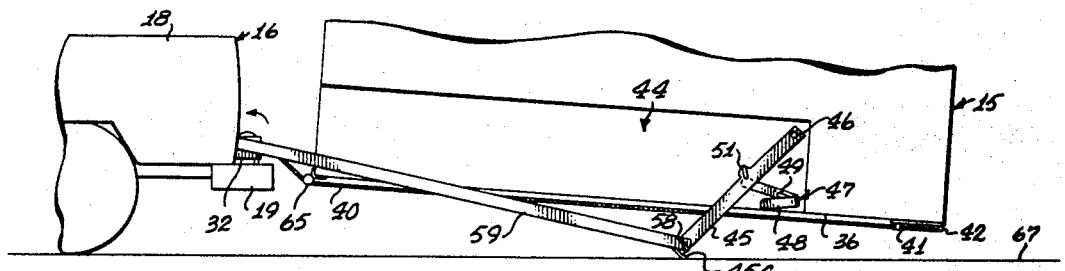
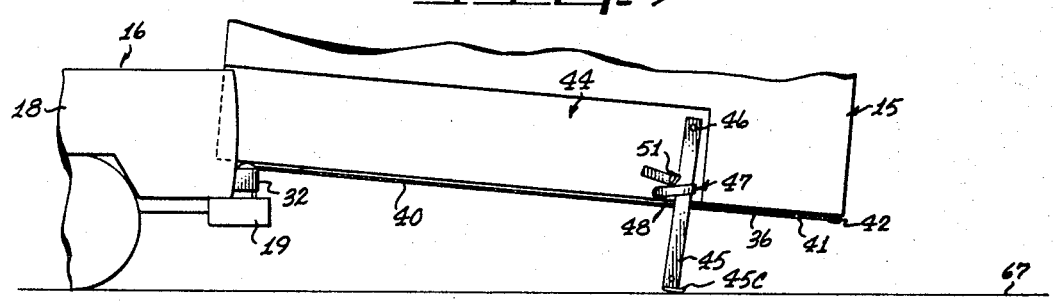
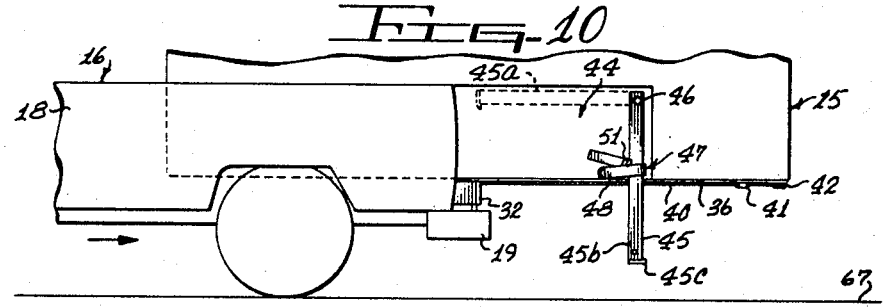
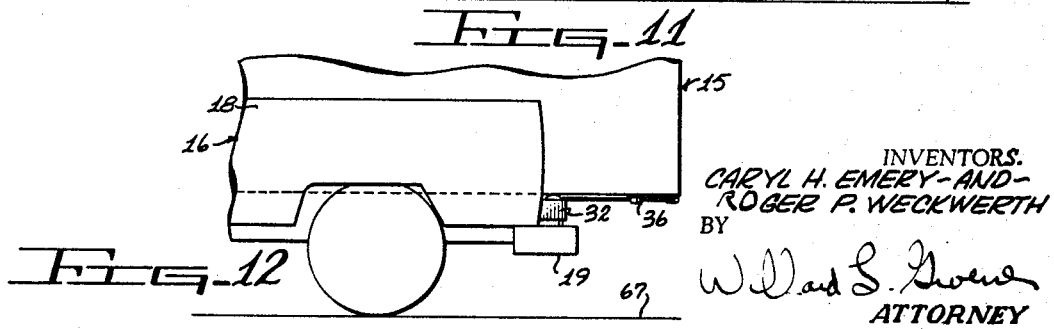

United States Patent Office 3,411,646
Patented Nov. 19, 1968

3,411,646
CAMPER MANIPULATING APPARATUS
FOR MOTOR VEHICLE
Caryl H. Emery, 1823 N. 70th St., Scottsdale, Ariz.
85257, and Roger P. Weckwerth, 2249 W. Main,
Mesa, Ariz. 85201
Filed Jan. 26, 1967, Ser. No. 611,897
3 Claims. (Cl. 214—517)

ABSTRACT OF THE DISCLOSURE

An apparatus for manipulating a camper on to and off of a motor vehicle with particular regard to picking up a camper from the ground surface and raising it and pulling it forwardly on to the flat bed of a pickup truck including linkage and apparatus operable with a minimum of effort and without skill and force being required on the part of the operator of the mechanism.

Background of the invention

The field of this invention lies in motor vehicles and is particularly directed to apparatus for interconnecting and manipulating a camper relative to a flat bed truck and the like.

Heretofore it has been difficult without great effort, skill and care to take a camper from a parked ground position and place it upon the bed of a motor vehicle such as a flat bed truck. It has also been difficult to remove such a camper from the vehicle without extreme care and hazard being undertaken. Prior devices have been deficient in that elaborate complicated mechanisms, jacks, supports, sawhorses and similar devices when necessary and the skillful backing of the vehicle to and from the camper being required. Also the devices heretofore used were deficient in the great time consuming aspect of their manipulation and in making it difficult to easily position the camper down on the actual ground surface after it was removed from the truck so that the camper would be in stable, safe position when not in use on the vehicle.

Summary of the invention

It is an object of applicant's invention to provide a camper manipulating apparatus which is easy to operate and requires a minimum of skill and effort upon the part of the user to assemble the camper on the vehicle or remove it therefrom and place it in a parking position.

Still another object of this invention is to provide a device for smoothly and easily handling the camper so as not to disturb unnecessarily the contents in the camper when loading or unloading it from the vehicle.

Still another object of this invention is to utilize a smooth means for pulling the camper and motor vehicle together while assembling the device on the vehicle or in removing the same from the vehicle after the use of the camper has been dispensed with, without in any way interfering with the normal use of the motor vehicle or flat bed truck when the camper is removed therefrom.

Brief description of the drawings

FIG. 1 is a side elevation of the camper and manipulating apparatus incorporating the features of this invention.

FIG. 2 is a plan view of the apparatus shown in FIG. 1.

FIG. 3 is an enlarged fragmentary sectional view of the rear of the motor vehicle and apparatus of this invention on line 3—3 of FIG. 1.

FIG. 4 is an enlarged fragmentray sectional view on the line 4—4 of FIG. 3.

FIG. 5 is an enlarged fragmentary sectional view on the line 5—5 of FIG. 3.

FIG. 6 is an enlarged fragmentary sectional view on the line 6—6 of FIG. 1.

FIG. 6a is an enlarged perspective view of a leg latching and locking device.

FIG. 7 is an enlarged fragmentary sectional view on the line 7—7 of FIG. 1.

FIG. 8 is a view showing the camper resting at ground level at the initiation of the loading operation by the apparatus.

FIG. 9 shows the first step in initially raising the camper above the ground surface and moving it towards the bed of the motor vehicle.

FIG. 10 shows the camper with the front end started on to the bed of the vehicle and with the supporting legs locked in raised position.

FIG. 11 shows the camper being moved on to balanced position on the floor of the flat bed truck.

FIG. 12 shows the final movement of the camper into travel position.

Description of the preferred embodiment

As an example of a preferred embodiment of the invention, there is shown a camper indicated generally at 15 which is to be loaded and unloaded on the motor vehicle or pickup truck 16 having the bed 17, the sides 18 and bumper 19. The actuating element of the apparatus comprises a main angle iron member 20 having an upper horizontal leg 21 resting on the floor 17 of the truck 16 and secured thereto by suitable demountable hook pieces 22 extending through holes 23 formed in the bed 17 and hooked under the under surface 24 of the bed 17. The downwardly extending leg 25 abuts against the rear face 26 of the truck bed 17 and fixed to it is a pair of laterally spaced bearing plates 27 and 28 supported on their lower ends by suitable adjustable support bolts 29 engaging the top surface 30 of the bumper 19. A winch shaft 31 is journaled at each end in the bearing plates 28 and 29 and at one end is mounted a suitable gear box 32 on bearing plate 28 having appropriate gearing 33 and ratchet mechanism 34 operated on the crank handle shaft 35 for rotating and controlling the rotation of the winch shaft 31. Fixed on the winch shaft 31 adjacent the bearing plates 27 and 28 to receive and rotatively support the underside 36 of the camper 15 are the laterally spaced serrated rubber rollers 37. Intermediate these rollers are appropriate keyhole slots 38 formed in the winch shaft 31 and adapted to demountably receive the ends 39 of the manipulating cable 40 which extends rearwardly through eyelets 41 and 42 fixed to the underside 36 of the camper body 15 and are tensioned between the eyelets 41 and 42 by tension springs 43 interconnected between these portions of the cable 40 and the camper underside 36 to maintain an equalized pull on the two parallel runs of the cable 40 as it wraps up on or unwinds from the winch shaft 31 when actuated by a crank handle 44a applied to the crank handle shaft 35. Contained in recessed portions 44 on the lower parts of each side of the camper 15 are the legs 45 pivotally mounted at their upper ends on suitable pins 46 appropriately fixed to the frame of the camper 15 so that the legs may be swung from a retracted horizontal position 45a to a vertical supporting position 45b, FIG. 11. A releasable latch device shown generally at 47 provides means for holding the legs 45 in swung down vertical position 45b and comprises a U-shaped bracket 48 having one side fixed to the camper frame including an elongated slot 49 and a bent-out portion 50 surrounding the outside of the legs 45 to stabilize the lateral relative shifting of the legs and the camper. A locking plunger 51 is slidably mounted in a guide hole 52 formed in the legs 45 and has an operating T-handle 53 formed on its outer end. A suitable spring 54 serves to normally yieldingly move the inner end of the pin 51 into the slot 49 while a latch piece 55 fixed to the leg 45 has an abutment end 56 engaging under the T-handle 53 when rotated as shown in FIG. 6a, to hold the pin 51 released from the slot 49.

On the lower end of the legs 45 is provided a suitable ground engaging foot piece 45c immediately above which is demountably pivotally connected by pull pins 58 to control rods 59. The forward ends of the control rods 59 are provided with downwardly facing holes 60 which are placed over the upturned ends 61 of hook pieces 62 fixed to the angle iron member 20. A suitable lock ring 63 pivotally mounted at 64 on the bottom portions of the hook pieces 62 serves to demountably secure the ends of the control rods 59 to the angle iron member 20. Skid rollers 65 having cable guide grooves 66 to receive the runs of the manipulating cables 40 are journaled on the front edge of the camper as best shown in FIGS. 1 and 7.

Referring particularly to FIGS. 8 through 11, the operation of the described device will be explained: With the camper 15 resting on the ground surface 67 and the pickup truck positioned in front of the camper, the legs 45 are swung down with their ground engaging foot pieces contacting the ground surface 67. Control rods are pivotally connected by the pull pins 58 to the bottom of the legs 45 and hooked to the hook pieces 62. The cables 40 are hooked to the keyhole slots 38 in the winch shaft 31 the cables coming up through the guide grooves in the skid rollers 65, FIG. 7.

The winch shaft 31 is then rotated, counterclockwise, FIG. 9, wrapping up the cable thereon causing the camper to move forwardly toward the truck, the back end of the camper raising from the ground up on the legs 45 while the cables 40 raise the forward end of the camper and guide it up to the floor and serrated rubber rollers 37 of the winch shaft 31, FIG. 9, the legs 45 swinging to a vertical supporting position, FIG. 10, where they are then locked in position by the locking pins 51.

Continued counterclockwise rotation of the winch shaft 31 brings the camper forward to a position such as shown in FIG. 11 where the camper is fully supported intermediate its ends on the serrated rollers on the winch shaft 31, the control rods 59 having been removed, FIG. 10. The legs 45, FIG. 11, are then folded up to retracted position 45a.

Finally, by continued counterclockwise rotation of the winch shaft 31 the camper is drawn fully to forward traveling position of the truck bed as the skid rollers roll along and support the camper at its front end on the truck bed 17.

During the movement of the camper on the truck from the position of FIG. 9 through position of FIG. 10 to the position of FIG. 11, either the ground contacting feet 45a may skid along the ground or the truck brakes may be released to allow the truck to roll rearwardly under the camper.

To remove the camper from the truck, the reverse of the operations described are performed.

While the apparatus herein disclosed and described constitutes a preferred form of the invention, it is also to be understood that the apparatus is capable of mechanical alteration without departing from the spirit of the invention, and that such mechanical arrangement and commercial adaptation as fall within the scope of the appendent claims are intended to be included herein.

I claim:

1. A vehicle loading and unloading apparatus comprising in combination:
   (A) a vehicle having a substantially horizontal load carrying bed surface,
   (B) an object to be loaded and unloaded on said bed surface having a frame including a horizontally disposed bottom surface,
   (C) a pair of laterally spaced legs pivotally mounted at their upper ends on said object frame so as to swing from a horizontal retracted position down to a substantially vertical ground engaging position,
   (D) means on said object frame to releasably lock said legs in vertical ground engaging position,
   (E) a horizontal transverse winch shaft journaled on said vehicle bed,
   (F) manipulating cables interconnected between the rear of said bottom surface of said object frame and said winch shaft so as to be wrapped up on said winch shaft or unwound therefrom,
   (G) removably mounted control rods pivotally interconnected between said legs and said vehicle bed an acting in conjunction with the cables and legs to lower and raise, respectively, the object frame to and from the ground,
   (H) and rollers on said winch shaft arranged to operatively engage said bottom of said object frame so as to cooperate with said cables in moving said object to and from a loaded position on said vehicle.

2. In a vehicle loading and unloading apparatus as set forth in claim 1 wherein said cables extend under the bottom of said object frame from the rear thereof forwardly and then upwardly under the front edge thereof to said winch shaft.

3. In a vehicle loading and unloading apparatus as set forth in claim 1 wherein there is provided a combination skid roller and cable guide means provided at the front edge of said object frame bottom.

References Cited

UNITED STATES PATENTS

| | | | |
|---|---|---|---|
| 3,197,054 | 7/1965 | Settem | 214—517 |
| 3,229,839 | 1/1966 | Rasmussen | 214—517 |
| 3,262,591 | 7/1966 | Aldropp | 214—517 |

ALBERT J. MAKAY, *Primary Examiner.*